Feb. 14, 1950    M. GRAVINA    2,497,544

CENTRIFUGAL CLUTCH

Filed Aug. 20, 1945

Inventor:
M. Gravina
By E. F. Wenderoth Atty

Patented Feb. 14, 1950

2,497,544

UNITED STATES PATENT OFFICE 2,497,544

CENTRIFUGAL CLUTCH

Michel Gravina, Paris, France

Application August 20, 1945, Serial No. 611,565
In France June 27, 1944

Section 1, Public Law 690, August 8, 1946
Patent expires June 27, 1964

3 Claims. (Cl. 192—105)

My invention has for its object improvements in centrifugal clutches and particularly in those which may be easily controlled during operation, such for instance as described in the U. S. patent application Ser. No. 611,564 for Clutch devices, filed by Michel Gravina and Marcel Hawadier.

When a centrifugal clutch is used in conjunction with a variable speed engine, the necessity of gradually starting the driven part leads to making the clutch transmit the total power of the engine only when a certain rate of running is reached.

This produces a drawback due to the fact that if the speed of the engine is subsequently slowed down below said rate of running, the clutch is no longer capable of transmitting the whole power provided by the motor which may then begin slipping.

The chief object of the present invention is to eliminate said drawback by means of a sort of automatic locking of the clutch which allows it to continue transmitting the total power of the engine when the speed of rotation thereof decreases, this transmission continuing down to a rate of running which may be as low as it is desired.

Another drawback of conventional centrifugal clutches consists in that the power transmitted for a given rate of running varies with the wear of the clutch disc, which involves a variation in the progressivity of starting and necessitates of adjustments to compensate for this wear.

Another object of the invention is to eliminate this drawback while ensuring a constant power for the clutch for a given rate of running whatever may be the wear of the rubbing surfaces, without any adjustment being required.

In order to illustrate this invention, I have shown in Fig. 1, the power curve of a conventional centrifugal clutch and in Fig. 2, the power curve of a centrifugal clutch according to my invention.

In Fig. 1, the curve 1 illustrates the power of the clutch when the clutch disc is new and the curve 2 illustrates the power of the same clutch after a certain wear of the disc. Curve 3 illustrates the power of the motor.

It is apparent that the necessity of providing for progressivity in starting leads to transmitting the total driving power only when a rate of running $n$ for instance has been reached, progressivity of the drive being obtained by increasing from zero to $n$ the speed of the engine. For this reason, if the speed of the engine is subsequently reduced to a value below $n$, the clutch is no longer capable of transmitting the total driving power. Fig. 1 shows in hatched lines the zone corresponding to the power thus lost.

In Fig. 2, curve 4 indicating the power of the motor is the same as curve 3 in Fig. 1. Curve 5 shows the power curve of the clutch according to this invention for increasing speeds of the motor; it is identical with the curve 1 in Fig. 1. Progressivity in starting is therefore the same.

On the contrary when the rate of running rises beyond the value $n_1$ for which the clutch transmits the maximum power, and the engine is subsequently slowed down, the clutch continues transmitting this maximum power along curve 6 down to a given rate of running $n_2$ for which locking ceases being operative. Below this rate, the power of the clutch is the same as for increasing speeds.

Curve 7 shows in dotted lines the power of the clutch for a predetermined wear of the discs. It is apparent that it differs from the curves 5 and 6 only in the zone of powers higher than that of the engine; this difference remains therefore without any effect on the power transmitted by the clutch, which is limited to the power of the engine.

In the accompanying drawings given by way of example:

Figure 1:
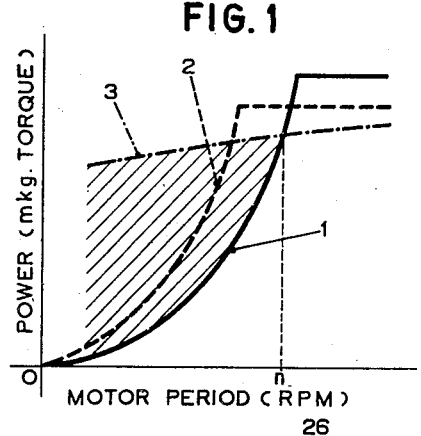
Figs. 1 and 2 are, as stated, curves illustrating the operation of my improved device.
Figure 2:
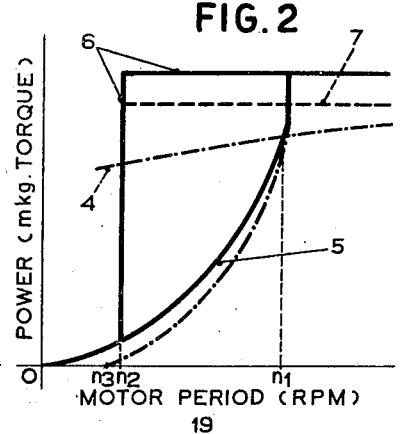
Figure 3:
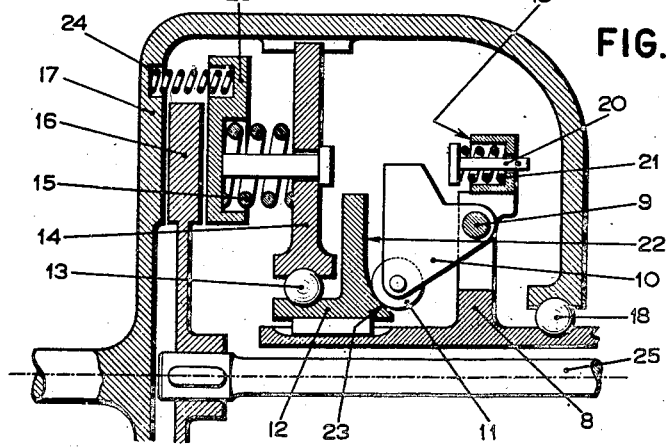
Fig. 3 is a diagrammatic longitudinal half section of an embodiment of my improved clutch in inoperative position.

As apparent in Fig. 3, plate 8 includes axes 9 upon which weights 10 are adapted to pivot, each weight being provided at its end with a roller 11 which exerts on plate 12, as it rolls on said plate, a thrust due to the action of the centrifugal force. This plate 12 transmits this thrust through roller bearing 13, flange 14, springs 15 and plate 26 so as to press clutch disc 16 against the driving flywheel 17 carried by roller bearing 18. Plate 8 is provided, on its face 19 acting as abutment for weights 10, with push rods 20 subjected to the action of return springs 21.

When plate 8 is driven by the engine through any desired means and in particular those disclosed in the above specified U. S. patent application and when this rotation is accelerated, centrifugal weights 10 move away from the axis of rotation and progressively engage disc 16. When the pressure exerted on springs 15 is higher than the value required for transmission of the driving torque, weights 10 are applied against the face 19 of plate 8 after having retracted the push rods 20 which compress springs 21.

Figure 4:
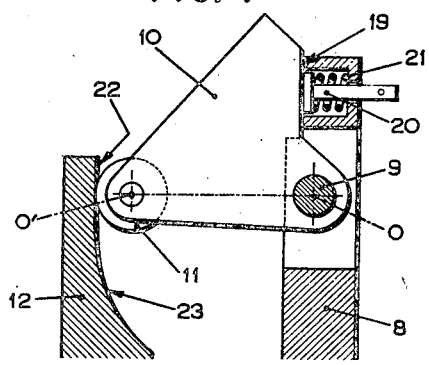
Fig. 4 shows at a larger scale a part of the same clutch, one weight of which is shown in its maximum operative position.

For the position illustrated in Fig. 4, line O, O' passing through the pivot axis of one of the centrifugal weights and the axis of the roller 11 on said weight is normal to the surface of plate 12 so that even if the rate of running decreases and the centrifugal force is reduced to a value lower than the thrust of springs 15, said thrust will not produce any reaction liable to return the weights into an inoperative position. The clutch is thus locked in its position of maximum power.

This locking is maintained as long as the action of the centrifugal force on weights 10 is higher than the thrust of return springs 21.

Springs 21 are calculated to balance this action of the centrifugal force for a given rate of running below which said springs return weights 10 towards their axis of rotation. As soon as line 0, 0' makes a sufficient angle with the surface of plate 12, springs 15 cooperate with the action of the springs 21 and return weights 10 into their position of equilibrium.

It is apparent that in cross section, plate 12 comprises a straight part 22 which serves, as just stated, for urging the plate back and locking it. This straight part is tangent at its lower end with a curved part 23 which serves for restraining plate 12 during the beginning of the displacement of weights 10. This curved part 23 is constituted so that the axial displacement of the plate 12 may be directly proportional to the angular displacement of the weights 10 whatever may be the point of contact of the roller 11 against this incurved part. Consequently for a given rate of running, the pressure exerted on the clutch disc is constant whatever be the wear of the disc. It is only beyond the rate of running for which roller 11 comes into contact with straight part 22 that the pressure ceases being constant, but at this moment the clutch transmits the total power of the motor.

Fig. 3 also shows that compensating springs 24 are inserted between flywheel 17 and plate 26. These springs prevent any parasitical driving of the disc 16 when the motor is idling and reduce the power of the clutch for low rates of running so as to allow a better progressivity in the driving of driven shaft 25.

Of course the example as above described and illustrated in the accompanying drawings is given merely by way of indication and changes may be made thereto without departing from the scope of my invention as defined in the accompanying claims.

What I claim is:

1. A centrifugal clutch for use with an engine which comprises, in combination, a driving member adapted to be operated by said engine and a driven member, both rotatable about a common axis, a clutch element carried by each of said driving and driven members to rotate together therewith, respectively, one of said clutch elements being slidable axially with respect to the other for cooperating engagement therewith, a part operatively connected with said axially slidable clutch element to move together therewith in the axial direction, a rotary support coaxial with said driving and driven members and adapted to be driven by said engine, radially movable centrifugally operated means mounted on said support and in cooperating engagement with a face of said part for controlling the axial displacements thereof, so as to cause movement of said clutch elements toward each other in response to an increase in the speed of said engine, stop means for limiting the outward displacements of said centrifugal means to a given position, said centrifugally operated means and the cooperating face of said part being made and arranged to keep said centrifugally operated means in said limit position for decreasing speeds of said driving member above a given value.

2. A centrifugal clutch for use with an engine which comprises, in combination, a driving member adapted to be operated by said engine and a driven member, both rotatable about a common axis, a clutch element carried by each of said driving and driven members to rotate together therewith, respectively, one of said clutch elements being slidable axially with respect to the other for cooperating engagement therewith, a part operatively connected with said axially slidable clutch element to move together therewith in the axial direction, a rotary support coaxial with said driving and driven members and adapted to be driven by said engine, radially movable centrifugally operated means mounted on said support and in cooperating engagement with a face of said part for controlling the axial displacements thereof, so as to cause movement of said clutch elements toward each other in response to an increase in the speed of said engine, stop means for limiting the outward displacements of said centrifugally operated means to a given position, said face of the axially sliding part being so shaped that the normal thereto at the point thereof where it cooperates with said centrifugally operated means in said limit position thereof is at least substantially at right angles to the trajectory of the corresponding point of said centrifugally operated means, and elastic means for urging said centrifugally operated means in the inward direction from said limit position.

3. A centrifugal clutch for use with an engine which comprises, in combination, a driving member adapted to be operated by said engine and a driven member, both rotatable about a common axis, a clutch element carried by each of said driving and driven members to rotate together therewith, respectively, one of said clutch elements being slidable axially with respect to the other for cooperating engagement therewith, a part operatively connected with said axially slidable clutch element to move together therewith in the axial direction a plate rotatable coaxially with said driving and driven members adapted to be operated by said engine to rotate together with said driving member, centrifugal masses pivoted to said plate about respective axes at right angles to the axis of rotation thereof and in cooperating engagement with a face of said part for controlling the axial displacements thereof, so as to cause movement of said clutch elements toward each other in response to an increase in the speed of said driving member, stop means on said plate for limiting the outward pivoting of said centrifugal masses to a given position, said face of the axially sliding part being so shaped that the normals thereto at the points thereof where it cooperates with said centrifugal masses in said limit position thereof pass through the respective pivot axes of said centrifugal masses, and elastic means for urging said centrifugal masses in the inward direction from said limit position.

MICHEL GRAVINA.

REFERENCES CITED

The following references are of record in the file of this patent:

UNITED STATES PATENTS

| Number | Name | Date |
|---|---|---|
| 2,191,846 | Carwardine | Feb. 27, 1940 |
| 2,406,049 | Thelander | Aug. 20, 1946 |